July 10, 1945.    V. D. DESMOND    2,380,368
RATTLE
Filed May 6, 1944
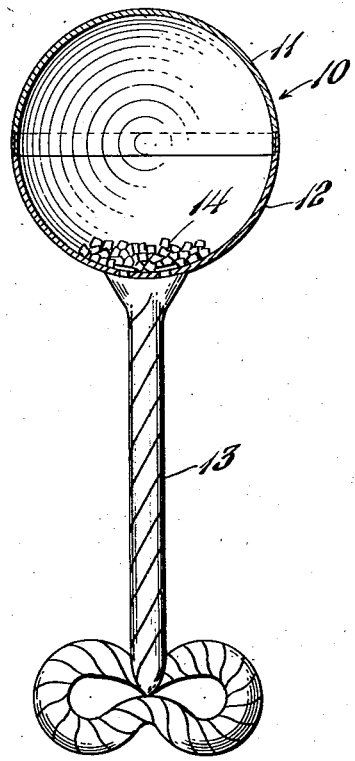
INVENTOR
Virginia D. Desmond
BY Barlow & Barlow
ATTORNEYS Patented July 10, 1945

2,380,368

UNITED STATES PATENT OFFICE 2,380,368

RATTLE

Virginia D. Desmond, Wrentham, Mass., assignor to Pilgrim Plastics, Inc., a corporation of Rhode Island Application May 6, 1944, Serial No. 534,412

5 Claims. (Cl. 46—193)

This invention relates to a rattle.

Heretofore in the formation of a rattle of the type used for amusement of a child, a material, such as stones, has been loosely placed in the hollow body so that when shaken the material will rattle. On some occasions the bulbous hollow body has been known to open or become broken and the child knowing no better has taken the material within the rattle and swallowed the same, thus harming the child.

One of the objects of this invention is to provide a rattle of such a character that even though the bulbous body is broken or comes apart the material within the rattle will be of such a character that injury will not be caused the child by swallowing the same.

With these and other objects in view, the invention consists of certain novel features of construction, as will be more fully described and particularly pointed out in the appended claims.

In the accompanying drawing, the figure illustrates a rattle with the hollow bulbous part in section, illustrating material of a loose nature within the body.

In proceeding with this invention I place within the hollow bulbous body of the rattle a loose material which will rattle and at the same time will be of some edible nature and thus if swallowed by the child will not harm the child.

With reference to the drawing 10 designates a hollow bulbous body, formed in halves 11 and 12, with a handle 13 secured to the half 12. Within this hollow bulbous body I have provided loose material 14 which will be of any edible form. Hard candy has been found suitable for use as it is sufficiently hard so that it will rattle in a Celluloid bulbous body such as that illustrated at 10 and 11. Other edible material such as rock salt or rice, or any hard substance, may be used. The only qualities being such that when taken internally the digestive system may take care of it.

I claim:

1. In a rattle a handle, a hollow bulbous body at one end thereof and a loose element in said body of edible material.

2. In a rattle a handle, a hollow bulbous body at one end thereof and a plurality of loose elements in said body of hard edible material.

3. In a rattle a handle, a hollow bulbous body at one end thereof and a loose element in said body of hard candy.

4. In a rattle a handle, a hollow bulbous body at one end thereof and a loose element in said body of rock salt.

5. In a rattle a handle, a hollow bulbous body at one end thereof and a loose element in said body of rice.

VIRGINIA D. DESMOND.